Oct. 7, 1952 W. KIRKMAN ET AL 2,612,689
TEMPLATE CUTTING MACHINE
Filed July 17, 1948 3 Sheets-Sheet 1

Inventors
William Kirkman and
Gilbert J. Barnett
By Nobbe & Swope
Attorneys

Inventors
William Kirkman and
Gilbert J. Barnett
By Nobbe & Swope
Attorneys

Oct. 7, 1952 — W. KIRKMAN ET AL — 2,612,689
TEMPLATE CUTTING MACHINE
Filed July 17, 1948 — 3 Sheets-Sheet 3
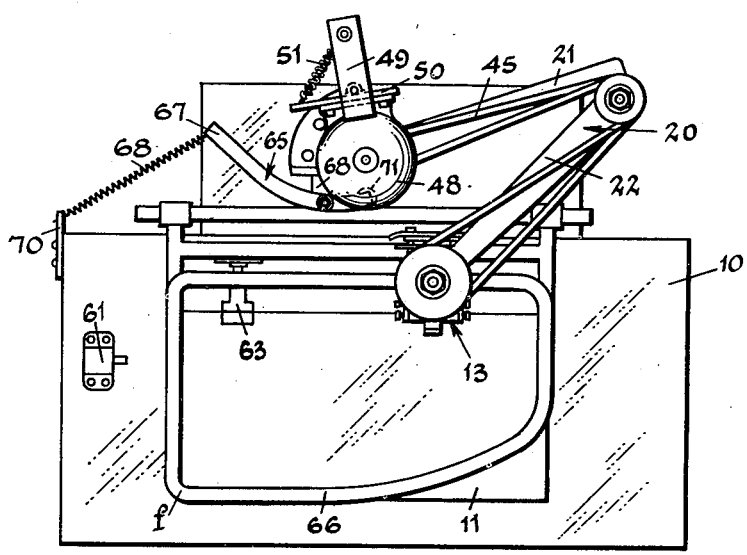
Fig. 6
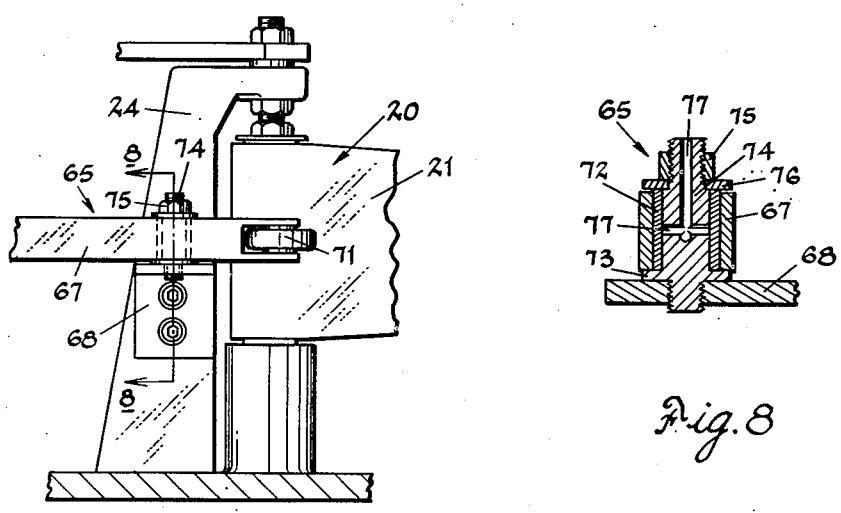
Fig. 7
Fig. 8
Inventors
William Kirkman and
Gilbert J. Barnett
By Nobbe & Swope
Attorneys

UNITED STATES PATENT OFFICE 2,612,689

TEMPLATE CUTTING MACHINE

William Kirkman and Gilbert J. Barnett, Ottawa, Ill., assignors to Libbey-Owens-Ford Glass Company, Toledo, Ohio, a corporation of Ohio Application July 17, 1948, Serial No. 39,226

3 Claims. (Cl. 33—27)

The present invention relates to cutting machines generally, and more particularly to an improvement in so-called template type cutting machines which are designed primarily for cutting shapes of predetermined size and outline from plates or sheets of glass.

Such cutting machines usually comprise a track type template, mounted above a cutting table, and having associated therewith a cutting unit movable on the track and including a cutting tool designed for cutting engagement with a plate of glass on the table to score the same during movement of the cutting unit around the template.

Although this invention is not restricted thereto, it has particular utility when used in connection with a cutting machine of this type. Briefly stated, the invention contemplates the combination, with such a machine, of a special retarding element adapted to modify, and specifically, to reduce, the speed of movement of the cutting unit at predetermined points in its cutting stroke to insure a score line that is of the necessary depth and uniformity throughout its length.

To illustrate, in known cutting units of this character, the supporting portions for the cutting unit are so designed that a definite right angular relationship is maintained with the open template. In this way, the cutting unit follows the arcuate portions of said track and carries the cutting tool in a path substantially parallel to the contour of the template. At the same time, during movement along the template, the cutting unit is gradually and progressively swung according to the curved lines generated to produce any side of the template outline or the corner curves interconnecting any two of the sides thereof.

Consequently, when it is found necessary, in a desired contour to be reproduced in the glass sheet or plate, that an interconnecting curve be of materially small radius, the abruptness of swinging movement enforced upon the cutting unit influences the cutting tool in a manner to cause a slurring or irregularity of cut, despite the fact that said tool is being maintained in contact with the surface to be cut or scored.

In other words, the cutting tool, which is of the "following" type and normally swivels about a vertically disposed supporting post, is caused to revolve in such an accelerated manner that the cutting edge of the tool is dragged along at times at an angle to its path of travel. Because of this, instead of producing a uniform score or break line of the desired clarity and depth, the tool leaves a ragged, irregular score line that materially reduces the possibility of a clean edged, template shaped, final cut or break.

According to the present invention, however, there is provided a retarding element, or cushioned brake member, which reduces the speed of the cutting unit during its travel around such sharp curves and therefore modifies any natural abruptness of movement, without, however, materially impeding the desired continuing movement of the unit. In traversing corner areas of template contours, traversal motion of the cutting unit from one side edge to another side edge of the template is thus appreciably reduced enabling the cutting tool to effect a score of regularity and uniform depth.

It is therefore an important aim of this invention to provide an improvement in machines of the above general character whereby a modifying influence may be exerted upon the operation thereof, such modifying influence being employed to reduce the movement of, without stopping, the cutter portion of such machines until a particular area of the template contour has been traversed.

Another object resides in the provision of a motion retarding means for temporarily controlling the rate of travel of the cutting element in a template type cutting machine and particularly during portions of said travel where the cutting element is caused to more or less abruptly change the direction of its travel.

Another object of the invention resides in the provision of an improvement in and for a cutting machine of the template type, said improvement comprising a motion retarding member located upon said machine to engage the cutting element thereof during a portion of its traversal of the template to assure exact reproduction of the template contour particularly in corner areas thereof.

Still another object is the provision in such a cutting machine of a special motion retarding member for the cutting element of said machine, the motion retarding member being of simple construction and capable of adjustment whereby the retarding influence can be modified as found necessary.

Other objects and advantages of the invention will become more apparent during the course of the following description, when taken in connection with the accompanying drawings.

In the drawings, wherein like numerals are employed to designate like parts throughout the same:

Fig. 6 is a plan view of a modified form of the motion retarding device;

Fig. 7 is a partial side view of the supporting post for the machine and the motion retarding device; and Fig. 8 is a sectional view, taken on the line 8—8 as indicated in Fig. 7, of the bearing support for the modified form of device.

Figure 1:
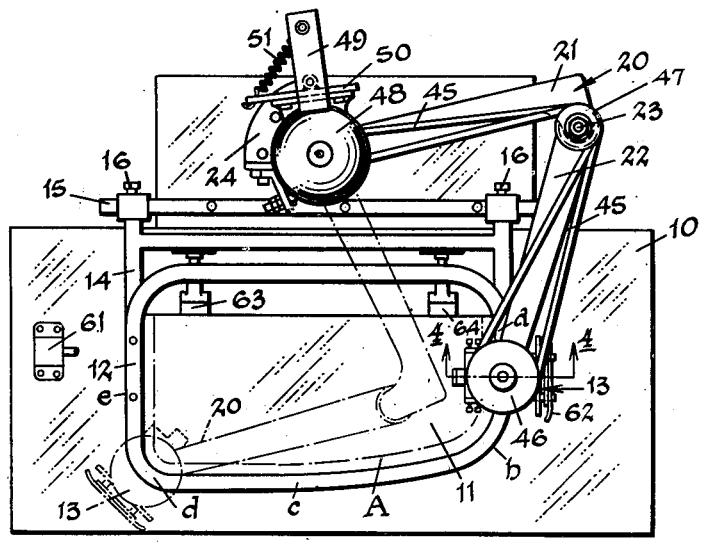
Fig. 1 is a plan view of a template cutting machine.

Referring to Fig. 1 of the drawings, the cutting machine illustrated therein comprises a flat horizontal table 10 for supporting the sheet of glass 11 during the cutting thereof. Arranged above the top of the table 10, in vertically spaced relation thereto, is a horizontal track template 12 having the same configuration as the form of light to be cut from the sheet 11.

As here shown, the track template is provided in the form of a continuous substantially rectangular loop, portions of the loop conforming to the desired shape of light to be cut while the remainder of the loop affords a return area by which the cutting mechanism, as indicated at 13, moves from the completion of one cut to the starting position for a subsequent cut.

The template is mounted on the table 10 by means of a bracket 14 which is adjustably carried on a rail 15 and secured thereto by screws 16, threaded into the ends of the bracket and adapted to engage the adjacent surfaces of the rail.

The cutting mechanism 13, includes a cutting unit or head 17, provided with a rotatable steel, follower type, cutting wheel 18 (Figs. 4 and 5), said unit being adaptable to travel around the template 12 to score the glass sheet 11 along the line indicated at A in Fig. 1. The cutting wheel 18 is carried in the cutting unit 17 at the end of, and offset from, a supporting post 19 in the usual manner and by this means the wheel is permitted sufficient amplitude of movement to produce the desired score line.

Figures 2, 3:
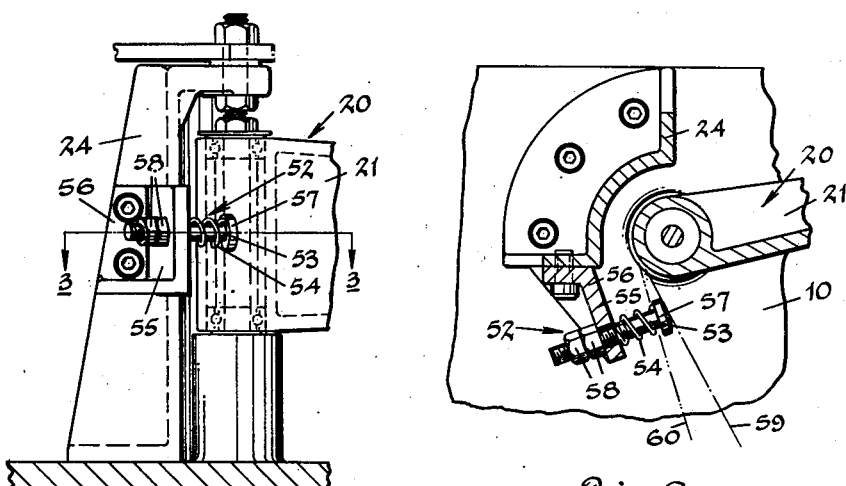
Fig. 2 is a partial side elevational view of the supporting post for the machine and of a motion retarding device constructed in accordance with the invention.
Fig. 3 is a view of a section on the line 3—3 in Fig. 2.
Figure 4:
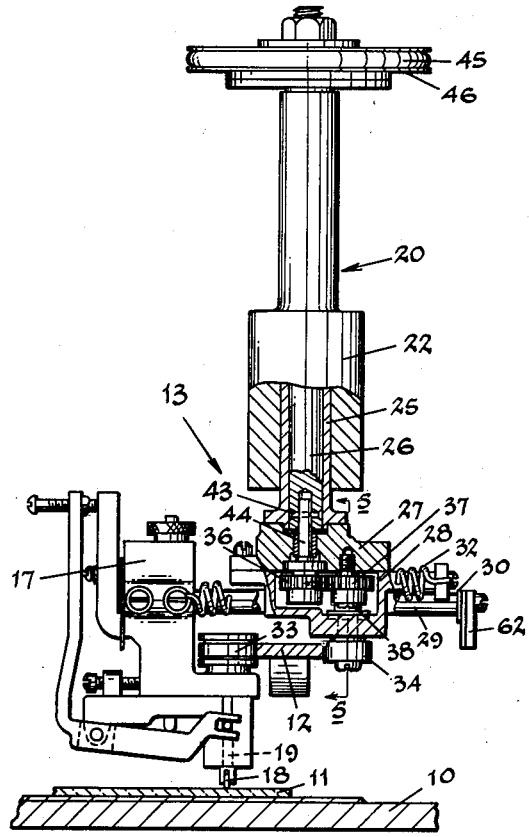
Fig. 4 is a view taken substantially on the line 4—4 in Fig. 1.

The cutting mechanism 13 is adapted to be carried about the template 12 and in uniform relation therewith by a swing arm 20. The swing arm comprises a pair of pivotally connected arm sections 21 and 22, coacting to open and close elbow-wise about a connecting pin 23. As illustrated in Figs. 1 and 2 of the drawings, the arm section 21 at its end opposite the pin 23 is journaled in a bracket 24 mounted on a part of the table 10 (Fig. 2). The arm section 22 will accordingly be carried within the radial scope of the arm section 21 while being capable of an individual radial movement about the axis of the pin 23. The outer end of the arm section 22 is formed to receive the journal bushings 25 and shaft 26 of the cutting mechanism 13 as best seen in Fig. 4. The bushing 25 is fastened by screws to top plate 27 of a housing 28 of the cutting mechanism 13.

Figure 5:
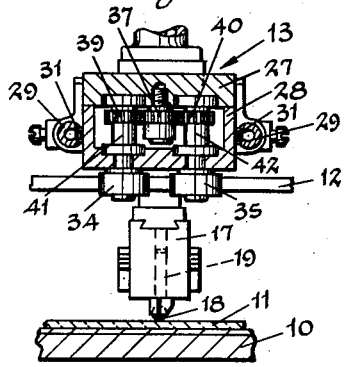
Fig. 5 is a view of a section taken on line 5—5 in Fig. 4.

The cutter head 17 and the housing 28 are associated by means of horizontally disposed, parallel rods 29 secured in the head 17 and extending along the sides of the housing. The ends of the rods are tied together to maintain their parallel relation by a cross bar 30. By means of rollers or guide wheels 31 carried by the housing and located in grooved tracks formed in the rods, the head may move relative to the housing while still being normally supported therefrom. The extent of such movement is flexibly affected by means of a pair of springs 32, paralleling the rods 29 and connected at their end loops to the housing 28 and to the cutter head 17. The springs tend to urge the parts toward each other and thus serve to effectively maintain the bearing members of the housing and cutter head in rolling contact with the track template 12. As best illustrated in Fig. 4, the cutter head 17 is provided with a bearing roller 33, while the housing 28 has complementary rollers 34 and 35 engaging the opposite edge of the template. The rollers 33, 34 and 35 guide the cutting mechanism 13 along the template 12, while at the same time the rollers 34 and 35 provide through suitable gearing the required power for impelling the mechanism to produce the desired cutting action. Thus, the rollers 34 and 35 are driven through a train of gears arranged within the housing 28 and which include a drive gear 36 and intermediate gear 37. The intermediate gear 37 is rotatable upon a vertical screw 38 threaded into the top plate 27 of the housing 28 and is located between the gears 39 and 40 keyed to the shafts 41 and 42 of the rollers 34 and 35, as best seen in Fig. 5.

The drive gear 36 is driven by the shaft 26 through a pin connection 43 and a stub shaft 44 to which the gear 36 is suitably keyed. Traction or motor power, for the cutting mechanism 13 through the gear 36 and shaft 26, is transmitted by a suitable belt 45 through the pulleys 46 and 47, about which the belt is trained, from a source of power such as the motor 48. The pulley 46 is secured to the extending end of the shaft 26 while the pulley 47 is mounted on the pin 23 which is formed to provide a journal support for the pulley. The motor 48 is carried in a frame 49 on a pivoted plate 50 in order that the belt 45 driven thereby may be subjected at all times to the influence of a tensioning member, as the spring 51. The motor support frame 49 is secured to the top of the bracket 24.

The cutting mechanism 13 in traversing the track template 12 causes the cutting wheel 18, carried on the cutter head 17, to produce the desired score line as indicated at A. In a great many instances, the desired contour or shape of light to be cut does not impose more than the development of rectangular templates having progressively arcuate side portions or substantially straight and/or parallel sides interconnecting by arcs of somewhat smaller radius, with a longer side having an arcuate contour of considerable radius. Where such corner arcs are of sufficiently large radius as to allow the cutting wheel 18 to swivel or swing about the axis of the post 19 and accommodate itself to the arc, little difficulty is encountered in obtaining a well defined score while moving the entire cutting mechanism at an established rate of speed. With a reduction of radius, particularly at the second turning corner, however, a problem has arisen since, in addition to the travel of the device, the separation or opening of the arm sectors 21 and 22 creates an abrupt whipping action and a consequent vibratory or jarring action that is imparted to the cutting wheel. Unless temporarily controlled, the momentum of the cutting mechanism 13 carries the device into this area of the template with the resultant whipping or swinging of the mechanism and gives a ragged and non-uniform cut. Upon completion of the turn in this corner area, the mechanism again enters a straight or substantially straight portion of the track template and the continued forward travel of course assures a regularity of cut or score line.

In order to relieve the abrupt action of the cutting mechanism 13 in the case of particularly sharp corner turns, according to a preferred form of the invention, a motion retarding element is located so as to engage the arm 20 or a part thereof as the mechanism approaches the pertinent corner of the template and to cushion the swinging action of the said mechanism without too greatly reducing its regular rate of travel. The retarding element thus is caused to collapse and to absorb, within the resiliency of its construction, the effect of the mechanism's movement while still exerting sufficient resistant force to allow the cutting wheel 18 to accommodate its revolution to the contour of the path through which it is moved.

As shown in the drawings, the cutting mechanism 13 starts at the right hand side of the track template 12, advances along template and gradually swivels about the shaft bushing 25 as the rollers 33, 34 and 35 follow the template in the portion a, the arcuate portion b, and side portion c having, as shown, an arcuate contour of much greater radius. Simultaneously, the sectors 21 and 22 of the arm 20 separate radially about the pin 23.

As the arcuate or corner portion d of the template is approached, the spread relation of the arm sectors has become sufficient to induce a differential of motion, the inner sector 21 decreasing the rate of its movement upon its journal, while the outer sector 22 is moved in a sweeping arc about the pivot pin 23. The suddenness of this action is of course imparted to the arm sectors by movement of the cutting mechanism along the corner portion d and as it enters the substantially straight portion e of the track template. The combined result of the motivated forces acts to produce at the cutting wheel 18 a rapid sweeping through the arc and before the wheel can accommodate the path of its cut without roughness, slurring or irregularity. The motion retarding member, however, engages the arm 20 at this point to reduce the rate of its approach to the corner of the template thereby dissipating the swing of the mechanism 13 and allowing it to traverse the arcuate portion d at a sufficiently moderate pace that the cutting wheel 15 will revolve with the supporting post 19 and score a line of regularity and depth in keeping with the remainder of the score line A.

As shown, the retarding member 52 comprises a headed rod 53 and a spring 54. The rod is slidably supported in the wall 55 of a bracket 56 which is suitably bolted to the adjacent wall of the bracket 24. The spring is carried by the rod and between the end 57 thereof and the wall of the bracket 56. Projection of the rod 53 from the bracket under influence of the spring is governed and may be adjusted by a pair of lock nuts 58 threaded onto the rod and bearing against the wall 55. As shown in Fig. 3, the rod is located so that the head 57 thereof will be engaged by the arm section 21 of the arm 20 when said arm section has been rotated to a position as indicated by phantom line in Fig. 1, or as indicated by the line 59 as shown in Fig. 3. Between the line 59 and the second line 60, the arm section 21 will depress the rod 53 and compress the spring 54, the reactionary force of the spring increasing in proportion to the spring's compression and acting to decrease the swinging movement of the arm sector. In so doing, the effect of the spring is transmitted to the movement of the cutting mechanism 13 from the arm section 21 through the outer arm section 22 and the travel of the mechanism is slowed down until the corner area of the template is traversed. Further compression of the spring is induced by the sweep of the arm section 22 as the cutting mechanism completes the cut; however, the extent of pivotal movement of the arm section 21 is relatively short until and as the sectors of the arm again approach each other as the cutting wheel leaves the glass sheet 11 and the mechanism in its entirety moves toward its idle or starting position. Also, if desired, a limit switch 61 may be located on the top of the table 10 and included in the control circuit of the motor 48 to open the said circuit, allowing the mechanism to traverse the remainder of the template 12 by reason of its inertia. To operate the switch 61, a plate 62 may be secured to the mechanism 13 as at the cross bar 30.

Adjustment of the lock nuts 58 along the threaded portion of the rod 53 can be made to advance or withdraw the rod 53 and relocate the point of engagement at which the head 57 of the rod will be contacted by the section 21 of the arm 20. Variations may thus be found and utilized according to the desired extent of influence to be imposed upon the swing arm 20 and the movement of the cutting mechanism 13.

In the usual operation of such forms of cutting machines, the glass sheet 11 is placed upon the top of the table 10 and is positioned against stops 63 and 64 which properly align the glass sheet with respect to the template. A suitable switch may then be operated to close a service circuit to the motor 48, or the stops 63 and 64 may be provided with suitable switch controlling portions that are included in the electrical control system of the motor so that, when the glass sheet 11 contacts both of the stops, the control system is completed and the motor 48 is energized to drive the cutting mechanism 13 along the track template 12 until the service circuit to the motor is opened upon completion of the cut.

A modified form of structure which may be used, especially with templates of different shape, or outline, than that previously discussed, is illustrated in Figs. 6 to 8, inclusive. While the modified motion retarding device, indicated generally by the numeral 65, produces a cushioning effect similar to that of the device 52, its manner of engagement with the swing arm 20 is particularly adapted for retarding the arm motion previous to and during movement of the cutter mechanism 13 about corners of especially small radius, such as shown at the corner f of the template 66.

The modified device 65 in form comprises a bar 67, pivotally carried on a supporting plate 68 attached to the bracket 24, and a tension spring 69 connected to the bar and to a post 70. Preferably the bar is curved throughout a portion of its length to permit movement without striking the bracket 24, when the bar is engaged by the inner section 21 of the swing arm 20. A rolling contact, to reduce friction, is effected by a bearing roller 71 supported in the end of the bar. Thus, as the arm sections 21 and 22 open elbow-wise and the cutter mechanism 13 is carried into an area of the template adjacent the corner f, the section 21 contacts the bearing roller 71 and causes the bar 67 to swing about its pivot against the tension of the spring 69. As the spring becomes distended, its tensional characteristics induce a gradual resistance to further movement of the bar and consequently have a retarding influence on the section 21 of the arm 20. The inertia of travel of the cutter mechanism is then controlled until the corner of the template has been turned.

As shown in Fig. 8, the bar is provided with a sleeve bearing 72 to afford pivotal movement of said bar on the plate 68 with a minimum of friction. The sleeve bearing is mounted on the shouldered base 73 of a stud 74 threaded at its lower end into the supporting plate. The opposite or upper end of the stud is also threaded to receive a lock nut 75 for securing the bearing 72 between the base of the stud and a washer 76. In order that the bearing can be constantly fed with a lubricant, passageways 77 may be drilled into the stud.

It is to be understood that the forms of the invention herewith shown and described are to be taken as preferred embodiments of the same, but that various other changes in the shape, size, location and arrangement of parts may be resorted to without departing from the spirit of the invention or the scope of the subjoined claims.

We claim:

1. A sheet cutting machine comprising a support for the sheet to be cut, a track template mounted in spaced relation to said support and having two sides connected by a relatively sharply curved portion for determining the pattern of cut, a cutting unit adapted to travel along said template and including a cutting tool engageable with the sheet to be cut and movable with said cutting unit along a path coinciding with said pattern of cut, a pivoted hinged arm for supporting the cutting unit during movement along the track template, means for moving said unit along said template, a cushioning and speed retarding member comprising a curved lever arm pivoted intermediate its ends and so positioned that pivotal movement of said lever arm will cause one end thereof to engage said first-mentioned arm at the point where the lever arm will act to reduce the speed of movement of the cutting tool as said tool leaves the portion of its path determined by one of said two sides of the template and moves onto the portion of its path determined by said sharply curved portion of the template, and spring means for urging said lever arm into engagement with said first-mentioned arm.

2. The combination with a sheet cutting machine including a support for the sheet to be cut, a template mounted in spaced relation to said support and having two sides connected by a relatively sharply curved portion, a cutting unit adapted to travel along said template and including a cutting tool engageable with the sheet to be cut, a pivoted hinged arm for supporting the cutting unit as it moves along the template, and means for moving said unit therealong, of a cushioning and movement retarding member positioned to engage said arm as said cutting tool leaves the portion of its path determined by one of said two sides of the template and moves onto the portion of its path determined by said sharply curved portion of the template and to subsequently disengage said arm upon continued movement of said cutting tool in the same direction.

3. A sheet cutting machine comprising a support for the sheet to be cut, a track template mounted in spaced relation to said support and having two sides connected by a relatively sharply curved portion for determining the pattern of cut, a cutting unit adapted to travel along said template and including a cutting tool engageable with the sheet to be cut and movable with said cutting unit along a path coinciding with said pattern of cut, a pivoted hinged arm for supporting the cutting unit during movement along the track template, means for moving said unit along said template, and a cushioning and speed retarding member comprising a spring pressed plunger positioned to engage said arm as said cutting tool leaves the portion of its path determined by one of said two sides of the template and moves onto the portion of its path determined by said sharply curved portion of the template and to subsequently disengage said arm upon continued movement of said cutting tool in the same direction.

WILLIAM KIRKMAN.
GILBERT J. BARNETT.

REFERENCES CITED

The following references are of record in the file of this patent:

UNITED STATES PATENTS

| Number | Name | Date |
|---|---|---|
| 2,230,651 | Morris | Feb. 4, 1941 |
| 2,383,208 | Mustered | Aug. 21, 1945 |